May 2, 1933.　　　　　N. J. POUX　　　　　1,906,808
SEPARABLE FASTENER
Filed Jan. 3, 1931
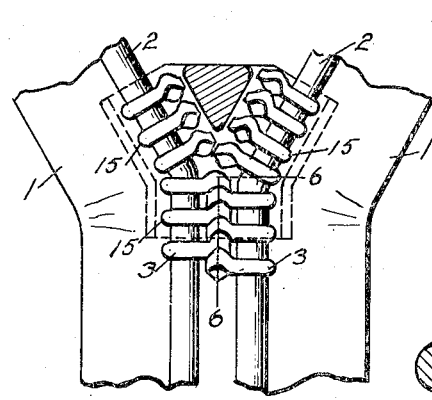
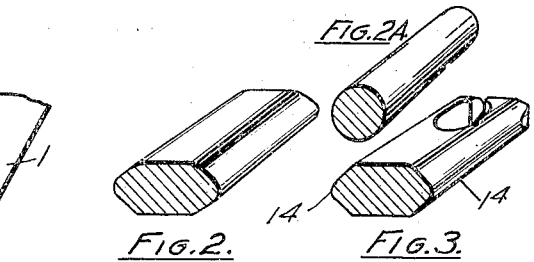
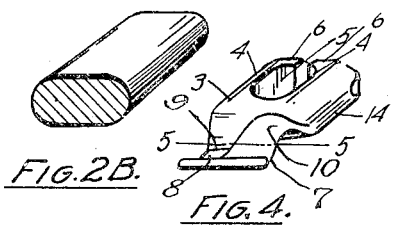
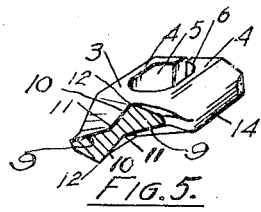
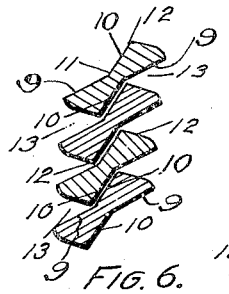
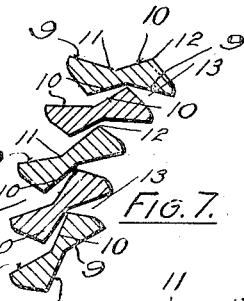
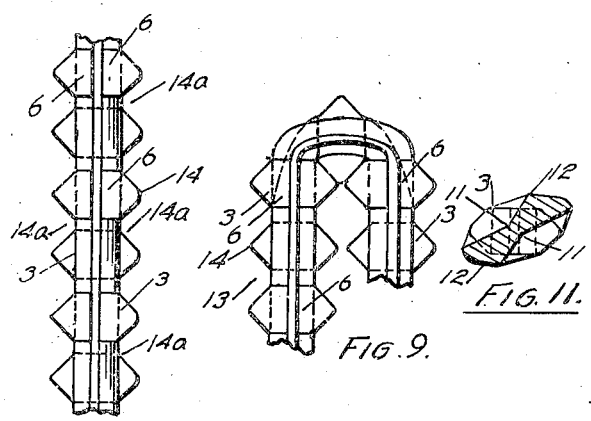
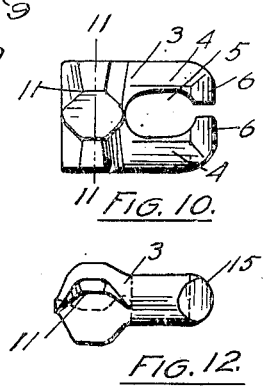
Noel J. Poux INVENTOR.
BY
ATTORNEYS.

Patented May 2, 1933

1,906,808

UNITED STATES PATENT OFFICE

NOEL J. POUX, OF MEADVILLE, PENNSYLVANIA, ASSIGNOR TO LION FASTENER, INC., OF MEADVILLE, PENNSYLVANIA, A CORPORATION OF DELAWARE

SEPARABLE FASTENER

Application filed January 3, 1931. Serial No. 506,362.

In the making of separable fasteners simplicity of construction is of the utmost importance and at the same time a construction which will give ease of movement, or flexibility to the united parts. The present invention is designed to simplify the construction and at the same time provide a fastener that may be more readily operated and more readily flexed. Features and details of the invention will appear from the specification and claims.

A preferred embodiment of the invention is illustrated in the accompanying drawing as follows:—

Fig. 1 shows an elevation of separable fasteners, the separable fasteners being partially locked.

Fig. 2 a perspective view of one of the blanks from which the fastener is made.

Fig. 2a a perspective view of an alternative form of blank.

Fig. 2b a perspective view of a second alternative form.

Fig. 3 a perspective view of a blank having the clamping jaws formed thereon.

Fig. 4 a perspective view of one of the finished members.

Fig. 5 a perspective view of one of the members in section on the line 5—5 in Fig. 4.

Fig. 6 a section on the line 6—6 in Fig. 1.

Fig. 7 a similar view with the stringers flexed.

Fig. 8 a side elevation of the fastener in straight position.

Fig. 9 a similar view with the fasteners flexed.

Fig. 10 a side elevation of one of the interlocking members.

Fig. 11 a section on the line 11—11 in Fig. 10 showing the relation of the engaging, or interlocking portion of the member to the shank.

Fig. 12 a plan view of one of the members.

1—1 mark the stringers. Each of these is provided with a rib 2 along one edge. Interlocking members 3 are provided with jaws 4 at the sides of an opening 5 in which the ribs 2 are arranged, the rear of the jaws having inturned portions 6 for more securely engaging the rib. The interlocking portions have reversely arranged engaging portions 7 and 8, these being provided with the convex surfaces 10 engaging concave surfaces 9. This interlocking portion is of hour-glass shape cross section with the apex of the opposing surfaces at 11. The junctures between the edge 12 of the member and the engaging surfaces 9 and 10 are seated in the apexes 11 so that in flexing the fastener the seating junctures rock in the seats, or apexes 11, as clearly shown in Fig. 7, the space 13 between the edges 12 and the face of the opposing member giving freedom for this rocking movement. The members have their edges 14 facing away from the sides of the stringers tapered. These tapered portions may be V-shaped, or rounded, the forms being indicated in the blanks shown in Figs. 2, 2a and 2b. This leaves a space 14a between the opposing tapered surfaces which permits the members to rock on each other, as clearly shown in Fig. 9. I prefer also to round the rear edges 15 of the members, the axis of this rounded portion being perpendicular to the stringer. This rounded end assures a greater freedom in the movement of the slider A. Preferably also the rear end is rounded on an axis lengthwise of the stringer so as to more surely ease the movement of the slider.

In forming the members, blanks, such as shown in Figs. 2, 2a and 2b are used, these being cut from ordinary drawn wire, are first slotted, as shown in Fig. 3 and then have the engaging portions coined, or stamped in them so as to complete the members.

What I claim as new is:—

1. In a separable fastener, the combination of stringers; and interlocking members secured on the edges of the stringers, said members having interlocking portions with opposing concave and convex engaging surfaces, said portions being of hour-glass cross section with the juncture of an edge and face of one member seated in the apex of the adjoining surfaces of an opposing member.

2. In a separable fastener, the combination of stringers; and interlocking members secured on the edges of the stringers, said members having interlocking portions with opposing concave and convex engaging surfaces, said portions being of hour-glass cross section with the juncture of an edge and face of one member seated in the apex of the adjoining surfaces of an opposing member and the edge of the seating member spaced from the face of the opposing member permitting it to rock in said seat.

In testimony whereof I have hereunto set my hand.

NOEL J. POUX.